US006826569B2

(12) United States Patent
Robertson (10) Patent No.: US 6,826,569 B2
(45) Date of Patent: Nov. 30, 2004

(54) METHOD FOR IDENTIFYING PATTERNS (75) Inventor: Ian Robertson, Willingham (GB)

(73) Assignee: 12 Limited (GB)

( * ) Notice: Subject to any disclaimer, the term of this patent is extended or adjusted under 35 U.S.C. 154(b) by 434 days.

(21) Appl. No.: 10/120,902

(22) Filed: Apr. 9, 2002

(65) Prior Publication Data

US 2003/0014408 A1 Jan. 16, 2003

(30) Foreign Application Priority Data

Apr. 10, 2001 (GB) ............................................. 0108959

(51) Int. Cl.$^7$ ............................................. G06F 17/30
(52) U.S. Cl. ............................. 707/6; 707/5; 707/101; 707/104.1; 717/156; 345/440; 370/258
(58) Field of Search ............................... 707/5, 6, 101, 707/104.1; 709/218; 702/150; 717/156; 345/440; 370/258

(56) References Cited

U.S. PATENT DOCUMENTS

| | | | |
|---|---|---|---|
| 5,809,499 A | * 9/1998 | Wong et al. .................... | 707/6 |
| 5,850,549 A | 12/1998 | Blainey et al. | |
| 5,995,113 A | * 11/1999 | Mitchell et al. ............ | 345/440 |
| 6,108,311 A | * 8/2000 | Ramaswami et al. ........ | 370/258 |
| 6,161,078 A | * 12/2000 | Ganley ........................ | 702/150 |

FOREIGN PATENT DOCUMENTS

JP 200250896 9/2000

OTHER PUBLICATIONS

Geva, Amir B., "Non–Stationary Time–Series Prediction Using Fuzzy Clustering", 18th International Conference of the North American Fuzzy Information Processing Society, NAFIPS, Jun. 1999, pp. 413–417. IEEE.*

Agrawal et al. "Fast Discovery of Association Rules" Advances in Knowledge Discovery and Data Mining Fayyad, Usama M; Piatsky–Shapiro, Gregory; Smyth, Padhraic; Uthurusamy, Ramaasamy eds. AAAI Press / The MIT Press : Mar. 1996 pp. 307–328.

Heikki Mannila, Hannu Toivonen and A. Inkeri Verkamo. "Discovery of Frequent Episodes in Event Sequences." Report C–1997–15 University of Helsinki, Finland, Department of Computer Science, Series of Publications C. Feb. 1997.

Chartrand, Gary and Ortrud R. Oellermann, Chapter 5 "Networks", pp. 129–160. Applied and Algorithmic Graph Theory. McGraw–Hill: Jul. 1, 1992.

\* cited by examiner

*Primary Examiner*—Shahid Alam
(74) *Attorney, Agent, or Firm*—Fish & Richardson P.C.

(57) ABSTRACT

The method identifies repeating patterns in sequential event streams, in which each event (A1, B, C, D, A2) is of a pre-determined event type (A, B, C, D) and occurs at a specified position within an event stream. In the method, an edge-weighted graph is generated in which each event type is represented by a vertex. A window of pre-determined width is then moved through an event stream and the edges in the graph are weighted in response to the co-occurrence of events in the window. Thus, if a window contains an event A1 and moves on through the event stream such that it also contains a second event B, the weighting of the edge linking the vertices representing the corresponding event types A, B in the graph is incremented. Repeating patterns in the event stream thus emerge as clusters of higher edge weights in the graph and can be detected by a graph clustering method. Individual instances of a pattern identified by the method can optionally be located by re-scanning the event stream for individual patterns.

13 Claims, 4 Drawing Sheets

Figure 1

Window 1: No links
Figure 2

Window 2: B links to A
Figure 3

Window 3: C links to A and B
Figure 4

Window 4: D links to A, B and C
Figure 5

Window 5: A drops out. No new links
Figure 6

Window 6: B drops out. No new links.
Figure 7

Window 7: C drops out. D links to A.
Figure 8

New weights after adding (A,C,D)
Figure 9

Figure 15 — Window 1
Figure 16 — Window 2

Window 3
Figure 17

METHOD FOR IDENTIFYING PATTERNS

FIELD OF THE INVENTION

The invention relates to a method for identifying patterns, and in particular for identifying repeating patterns in sequential event streams.

Basic Terminology

We consider a stream of events, which are ordered according to some numerical criterion such as time, spatial position or relative proximity. Events are typed (i.e. each event is of a predetermined type), so that the event stream may be represented as a sequence of events each identified by a type identifier, or type-id, and a coordinate identifying the position of the event in the sequence; the event is said to occur at that position, which may for example be a time or a spatial position, or simply represent the ordering of the event relative to other events in the stream.

The following example represents a sequence of seven ordered events of four distinct types A, B, C and D, in which each event is represented as a (<type-id>, <position>) pair.
((A, 6), (B, 7), (C, 9), (D, 29), (A, 44), (B, 47), (C, 48))

Notice that the type A, B and C events occur two times in the sequence, and that on both occasions their coordinates indicate that they are relatively close together. In the example, we use an integer to represent position, but any numerical value may be used.

A repeating pattern, or simply a pattern, is defined as a set of types whose corresponding events repeatedly occur at around the same position. When these events do occur at around the same position, we say that the pattern occurs or is instantiated at that position, and that the events form an occurrence or instance of the pattern. Referring again to the previous example, if the three types A, B, and C constitute a pattern, then the event stream can be said to illustrate two instances of that pattern.

BACKGROUND OF THE INVENTION

Previous approaches to the problem of searching data for repeating patterns have generally aimed to identify repeating temporal patterns, and have used the principle of moving a time window stepwise through the data and identifying events in the window at each position to reduce the problem to one of itemset counting (reference 1). Each position of the time window is thus used to define an itemset, in which each item is an event type. The itemsets are then processed through a standard itemset counting algorithm (reference 2). The frequent itemsets (itemsets occurring more than a specified number of times) are then declared to be the frequent repeating patterns. This approach has a number of drawbacks:

1. Successive positions of the moving time window overlap, leading to multiple counting of neighbouring event types. (If successive window positions do not overlap, pattern instances are too easily missed).
2. The frequent itemsets generally exhibit a complex pattern of nesting and overlap, which can conceal the true nature of the patterns in the data stream.
3. The itemset counting algorithms require the user to specify a minimum frequency for the patterns to be found. Setting this parameter is extremely difficult in practice. Setting it too high results in patterns being missed. More importantly, setting this parameter too low results in a huge increase in the amount of computer time and memory required to perform the count.
4. Event streams containing several comparatively infrequently repeating patterns present particular problems, because of the need to use a small frequency threshold to catch such patterns. Itemset counting algorithms perform poorly when searching for low frequency patterns.

SUMMARY OF THE INVENTION

The invention provides a method and a computer program for identifying repeating patterns in an event stream as defined in the appended independent claim, to which reference should now be made. Preferred or advantageous features of the invention are set out in dependent subclaims.

In a preferred aspect, the invention therefore provides a method for the detection of repeating patterns in sequential typed event streams, which advantageously makes use of the recognition that repeating patterns can be identified as clusters in an edge-weighted graph derived from a sliding or moving window scheme, together with the manner in which the edge weights are derived from the windows themselves.

Event types that form a repeating pattern tend to occur more frequently within a short distance of one another than with other event types. In a preferred embodiment, each event type is represented by a vertex in an edge-weighted graph. Our method then detects repeating patterns by examining the contents of a narrow fixed width window as it is moved, preferably in a single pass, through the event stream, and calculating edge weights in the graph to reflect the frequency with which types (vertices) co-occur in the moving window. Groups of types (vertices) that co-occur frequently emerge as clusters of higher edge weights in the graph, and can be detected by any standard graph clustering method.

One option would be to use a cluster detection method based on a graph connectivity criterion, such as the method set out in Appendix 1 herein. See reference 3 for a definition of connectivity and any other graph-theoretic terms used in this document.

Once clusters, or patterns, of types have been identified, pattern instances may advantageously be located by re-scanning the event stream for each pattern in turn. For the rescanning process, the event stream is preferably edited to retain only those events corresponding to types in the pattern under investigation, to reduce processing time. As the window passes through these events, the pattern instances emerge as non-overlapping sets of contiguous pattern events.

A pattern instance is said to be complete if every type in the pattern is represented by a corresponding event. A pattern instance is said to be partial if some of the types are not so represented. The coverage of a pattern instance is defined as the percentage of the types in the pattern represented by events. The frequency of a pattern is defined as the number of times a pattern is instantiated in a sequence.

It will be appreciated that the method described above may advantageously detect partial instances of patterns. In a preferred embodiment of the invention, a coverage threshold may be specified, for example by a user, and pattern instances with a coverage below the threshold may be rejected. This enables a user to search for and identify partial patterns in a controlled way.

The choice of window width is preferably under the user's control, and may depend on the nature of the event data being analysed. For example, for telephone call data where a search is being made to identify telephone calls between individuals which may be linked, a window width of half an hour to an hour might be appropriate. For financial data, where a search might be made for financial transactions which may be linked, the width might be greater—one to two days perhaps.

In some applications, events of different types may occur at markedly different rates. Consider, for example, an event stream consisting of a mixture of telephone call events and postal delivery events. Typically the telephone calls will be occurring frequently, whereas postal deliveries occur only once or perhaps twice a day. In order to capture a pattern of the form (Package Delivered to A, A calls B, A calls C), the following preferred embodiment of the invention may be used.

This embodiment allows sub-windows of different widths to be assigned to different types of event. The sub-window widths are chosen to match the characteristics of the event types to which they are applied. Also, separate event streams are prepared, each containing only events of predetermined types, but the corresponding edge-weighted graph contains vertices corresponding to all event types. The sub-windows are then moved simultaneously, in parallel, through their own event streams. The contents of the two sub-windows are treated as if they come from one window for the purposes of weighting the edges in the graph.

With the example of a mixture of telephone call events and postal delivery events mentioned above, we might choose to use two sub-windows, one set to a width of one day to capture postal delivery events and the other set to a width of one hour to capture telephone call events. If the telephone window at a particular position contains events of types A and B, while the postal sub-window at the same position contains an event of type C, then edge weighting in the graph would be applied to indicate not only a link between A and B but also links between A and C and between B and C.

The sub-windows of a window may be aligned in various configurations. One possibility is a central alignment, in which sub-windows share a common mid-position. Alternatively sub-windows may be aligned at either end, or at some other position. Sub-window alignment may be selected depending on the type of data being investigated. For instance, in the example given above it may be desirable to search for patterns involving postal events following telephone events (Mr A phones Mr B, to tell him to post a package to Mr C). Aligning the start times of the two sub-windows may best achieve this.

It will be appreciated that in this embodiment it is not necessary to prepare multiple event streams as described, but that an equivalent effect would be obtained by moving two or more parallel sub-windows through the same event stream and counting within each sub-window in each position only events of types appropriate to that sub-window.

In summary, a preferred embodiment of the invention may advantageously use the following steps.

1. Select events for analysis, and sort into sequential order.
2. Identify the unique set of event types defined by the events.
3. Classify the event types for sub-window assignment (multiple sub-window case only).
4. Select a window width (or widths for the multiple sub-window case) appropriate to the event data under analysis.
5. Create a graph with vertices representing each event type, and with no edges (or edge weights) initially.
6. Move the window through the event stream, and add weighted edges to the graph accordingly.
7. Locate clusters in the final edge-weighted graph. The types in these clusters define the patterns found by the method.
8. For each pattern in turn, edit the data stream by selecting the events whose underlying types are in the pattern. These edited data streams are termed pattern event sets.
9. Locate pattern instances by moving the window through the pattern event sets and identifying non-overlapping windows where pattern events are present.
10. Reject instances where the coverage is below the requested threshold level.
11. Output the final set of patterns and pattern instances.

Pattern Properties

Our method is driven by the occurrence of event types close together, and is not sensitive to the precise order in which the events occur in the event stream. Hence a pattern of the form (A, B) does not necessarily imply that A events always precede B events in the pattern. The only implication is that these event types are seen close together. This is a significant benefit because it provides a degree of stability to the pattern finding method. The precise order, and any variations from this order, can be studied by viewing the pattern instances in an event sequence display, i.e. in the results generated by the method.

The patterns found by the method are derived from a clustering of the position-independent weighted graph generated from the sequentially-ordered event stream. Because of this, a certain amount of smoothing is imparted to the final patterns. Suppose, for example, that event type pairs (A, B), (B, C) and (A, C) are captured by several distinct windows during the initial scan of the event stream. The edge weighting scheme will attach high weight to the edges linking the vertices A, B, and C so that the graph clustering method will identify (A, B, C) as a cluster, or pattern. Nevertheless, there may be few if any positions in the event stream where A, B, and C all co-occur in close proximity. This smoothing is a significant benefit of the method. A conventional combinatorial method based on the direct counting of co-occurrence patterns would not be able to perform this smoothing. It is because of this smoothing that not all pattern instances may exhibit 100% coverage.

Because our method uses a connectivity-based graph clustering technique to identify patterns (clusters), it is able to identify relatively infrequent patterns as well as frequently occurring ones. This is because even relatively infrequent patterns generate regions of locally raised connectivity in the weighted graph, and these are recognised as clusters by the clustering method.

The method of the invention may advantageously be applied directly to any form of sequential event stream. Specific examples include:

1. Telecommunication switch alarm logs (events may be types of faults occurring in the switch).
2. Alarm messages on medical monitoring equipment. Patterns here may provide diagnostically significant information to clinicians.
3. Analysis of intelligence surveillance logs.

In a transactional context, examples include:

1. Telephone call data.
2. Bank account transfer data.
3. Email message data.
4. Internet traffic data.
5. Movements of goods/people between countries/towns.

The method may also be applied directly to any combination of the above. For example, fraud investigators might wish to search for repeating patterns in movements recorded in a surveillance log, telephone call data and bank transfer data. A typical pattern might then be: Mr Pink visits Mr Blue, Mr Blue telephones Mr Big and cash flows from Account 1 to Account 2.

DESCRIPTION OF SPECIFIC EMBODIMENTS AND BEST MODE OF THE INVENTION

Specific embodiments of the invention will now be described by way of example with reference to the drawings, in which.

Figure 1:
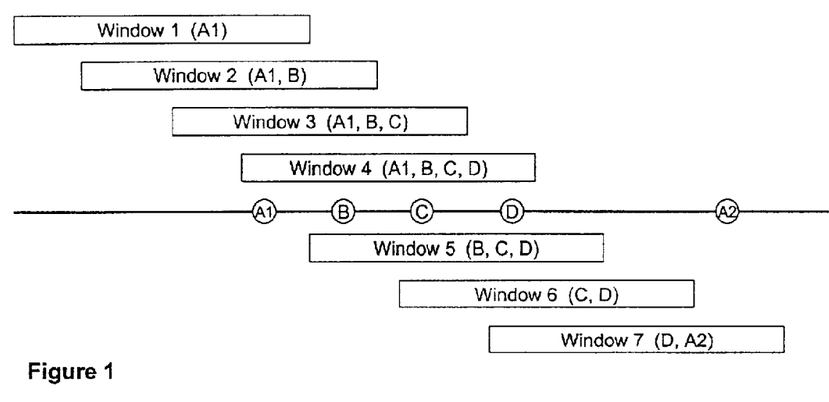
FIG. 1 illustrates a window moving through an event stream in a first embodiment of the invention.

The construction of edge weights from the movement of a window is best described through an example. FIG. 1 shows five events set out on a time line. The labels A1, B, C, D, A2 represent the events, which are of event types A, B, C, D, both events A1 and A2 being of type A. FIG. 1 also shows a window in seven successive positions as it slides past the events.

FIGS. 2 to 8 show the four types A, B, C, D as vertices in a graph, together with the edge weights appropriate to each window position as the graph develops.

Whenever the window slides to a position where it captures a new event, the edge weights in the graph between the new event type and the event types already represented within the window are incremented. Edge weights between types already present in the window are not updated, since this would bias the final weights. If several new events are tied at the same position in the event stream, each tied event is processed as if it were not tied. The order in which tied events are processed does not change the final edge weights.

Figure 2:
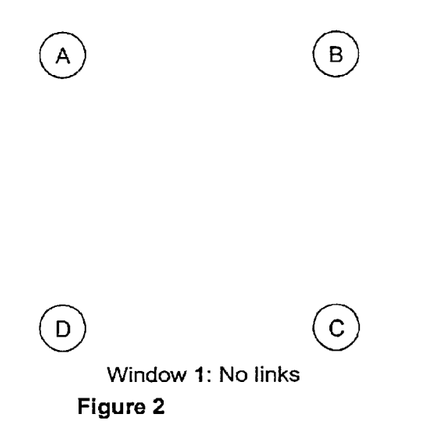
FIGS. 2 to 8 illustrate stages in the development of an edge-weighted graph based on the window movement shown in FIG. 1.
Figure 3:
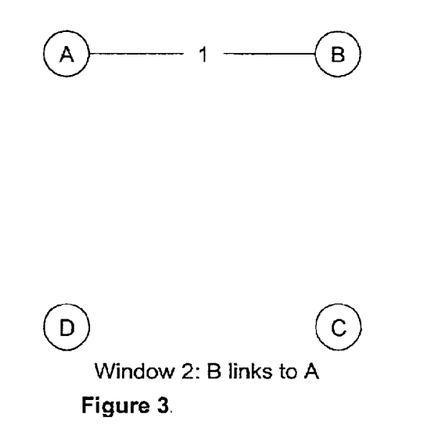
Figure 4:
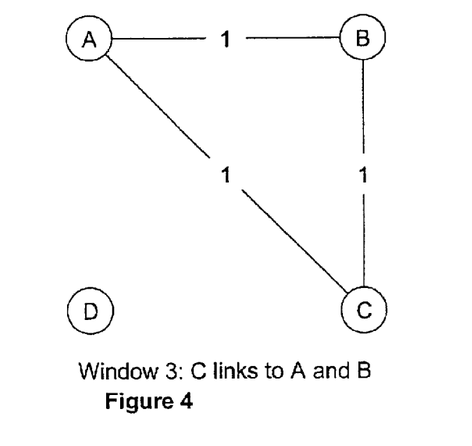
Figure 5:
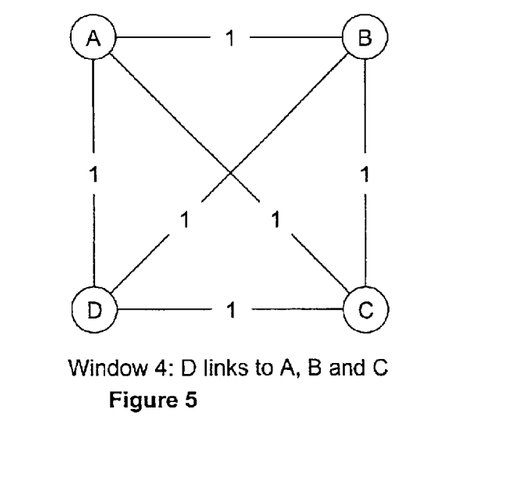
Figure 6:
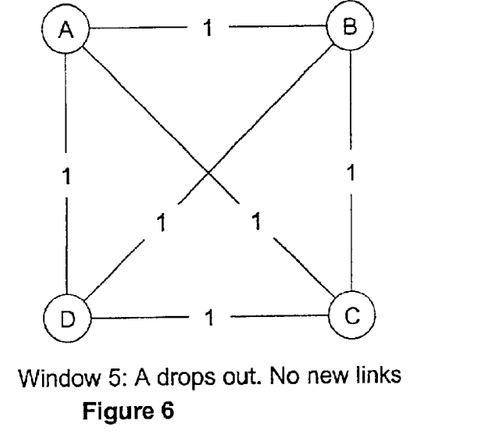
Figure 7:
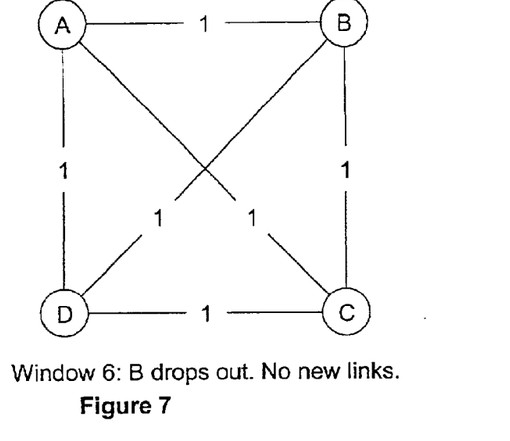
Figure 8:
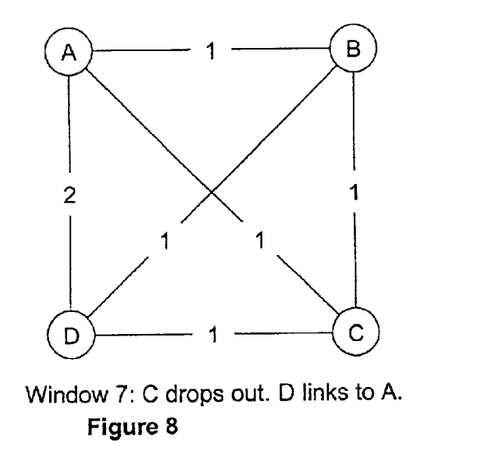

FIG. 2 corresponds to window position 1 in FIG. 1. Since window position 1 contains only event A1, no edge weights are indicated in the graph. FIG. 3 corresponds to window position 2, which contains events A1 and B, so the edge weight between vertices A and B (edge weight A-B) is incremented to value 1. FIG. 4 corresponds to window position 3, which contains events A1, B and C. Of these events, only event C is newly contained in the window, and so edge weights A-C and B-C are incremented to value 1 but edge weight A-B is not modified. FIG. 5 corresponds to window position 4, which by comparison with window position 3 newly contains event D. Therefore, in FIG. 5 the edge weights A-D, B-D and C-D are incremented to 1. FIG. 6 corresponds to window position 5, which by comparison with window position 4 still contains events B, C and D but has lost event A1. Since the window contains no new events, no changes to the edge weights are made. FIG. 7 corresponds to window position 6, which by comparison with window position 5 still contains events C and D but has lost event B. Since the window contains no new events, no changes to the edge weights are made. FIG. 8 corresponds to window position 7, which by comparison with window position 6 has lost event C but newly contains event A2. Therefore, in FIG. 8 the edge weight A-D is incremented to 2.

In the example, the transition of the sliding window past the five events results in a clique graph for the underlying types, in which all edge weights are 1 except edge weight A-D, which is 2. With real data, the final weights would be considerably more complex, reflecting the patterns of co-occurrence between the types and the varying intervals between the events.

Figure 9:
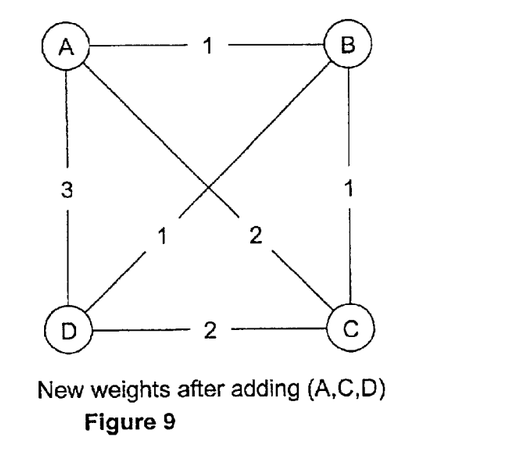
FIG. 9 shows a further development of the edge-weighted graph of FIG. 8.

FIG. 9 shows how the edge weights in the above example would change as the time window moved past a burst of three closely-spaced events, (A,C,D), which are spaced from the events in FIG. 1 by a distance greater than the width of the window.

The width of the sliding window is an input parameter to the method. The value selected will depend on the nature of the event data stream. Too small a width will result in the method failing to detect some associations. Too large a value will result in excessive smoothing of the patterns, and the generation of large clusters. When searching for telephone call patterns, a window width of half an hour to one hour has generally proved very successful in tests. On some telephone data, however, where large numbers of very short calls are being made rapidly, a window width of just 10 to 15 minutes was more effective. When analysing financial transaction data, window widths of around one to two days are appropriate, particularly when transaction data are recorded to the nearest day.

Application to Temporal Transaction Data Streams

Our method finds particular application in the analysis of temporal transaction data streams, such as those found in the analysis of telephone call or financial transaction data. The particular characteristics of this application are worthy of explicit discussion.

A transaction (corresponding to an event) is a transfer or communication (which may be directed) between two entities or nodes, the transfer occurring at a specific date and time. In an event stream, several transactions may occur between a given pair of nodes, each at different times. When we wish to describe the act of communication between two nodes, without reference to a specific date or time, we refer to the connection between the nodes. Hence connections describe the paths of communication between the nodes, and the transactions define the precise times at which the communications take place. The term connection therefore corresponds to the term type, as used above, and a transaction (event) is an instance of a connection (type).

Figure 10:
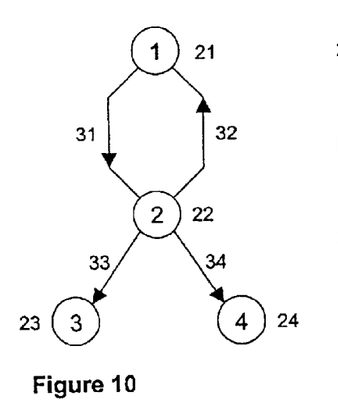
FIG. 10 illustrates connections between four nodes in a further embodiment of the invention.
Figure 11:
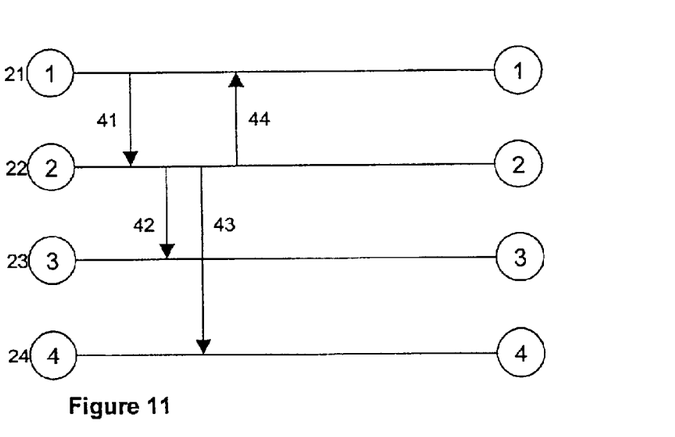
FIG. 11 illustrates transactions corresponding to the connections of FIG. 10.

Moreover, each transaction is said to exist on or belong to an underlying connection. The distinction between connections and transactions is illustrated in FIGS. 10 and 11. FIG. 10 shows four nodes 21, 22, 23, 24 with four connections 31, 32, 33, 34 between them. The connections are directed, connections 31 and 32 linking nodes 21 and 22 in opposite directions. FIG. 11 shows a time line with four transactions 41, 42, 43, 44, one on each of the connections.

In order to apply our method to this kind of data, we identify an event with a transaction (telephone call), position with time, and an event type with a connection. Our method then identifies repeating patterns of telephone calls or financial account transfers. The pattern properties discussed earlier are particularly valuable in this kind of application, since it is the grouping of temporally correlated calls which is important, not the precise order or the coverage of the identified instances.

Figure 12:
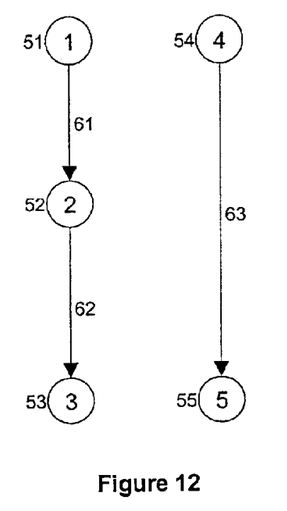
FIG. 12 illustrates connections between five nodes in a further embodiment of the invention.
Figure 13:
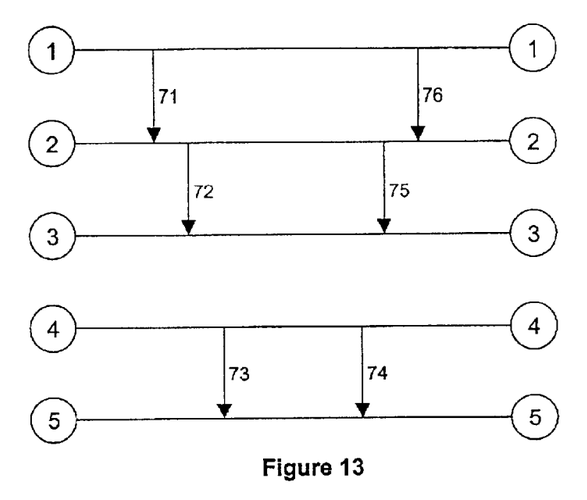
FIG. 13 illustrates transactions corresponding to the connections of FIG. 12.

In this transactional context, there is one further significant benefit of our pattern finding technique. The method does not require any direct linkage or contact between the nodes and connections that form a pattern. A tendency for transactions (or events) to occur at around the same time is sufficient for a link to be established. Hence the patterns detected can highlight potential links between unrelated nodes and connections. FIGS. 12 and 13 illustrate the kind of disconnected pattern that our method can detect. FIG. 12 shows five nodes 51, 52, 53, 54, 55 linked by three connections 61, 62, 63. The nodes are connected in two separate groups, however, nodes 51, 52 and 53 not being connected at all to nodes 54 and 55. FIG. 13 shows six transactions 71, 72, 73, 74, 75, 76 on these connections on a time line, in which the use of a suitably-sized window would detect two instances of a pattern containing connections (types) 61, 62 and 63 even though there is no direct contact between these connections.

The Use of Multiple Sub-Windows

Figure 14:
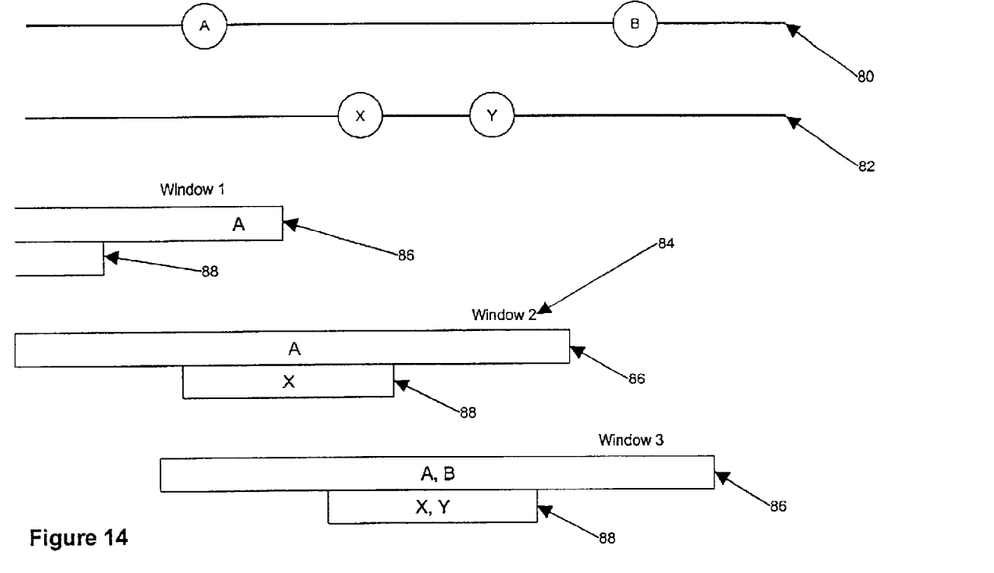
FIG. 14 illustrates a window comprising two sub-windows moving through parallel event streams in a further embodiment of the invention.

The following embodiment illustrates the use of multiple sub-windows to find patterns involving data of different types, in which the distances between the different events in patterns (i.e. the overall widths of the patterns) are significantly different. FIG. 14 shows two time lines 80, 82. Time line 80 carries data relating to postal delivery events and time line 82 carries data relating to telephone call events. Two events A, B are set out on time line 80 and two events X, Y are set out on time line 82. The events are of event types A, B, X, Y respectively, types A and B being postal delivery events and types X and Y being telephone call events. FIG. 14 also shows a window 84 in three successive positions as it slides past the events. The window comprises two sub-windows 86, 88 of different widths, reflecting the expectation that patterns in postal delivery information will be more widely spaced in time than patterns in telephone call information.

Figure 15:
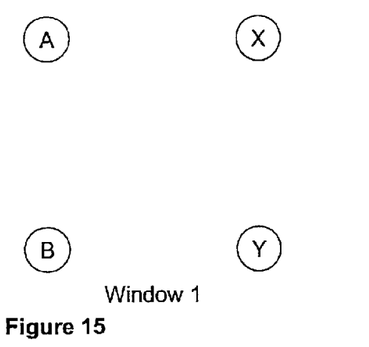
FIGS. 15 to 17 illustrate stages in the development of an edge-weighted graph based on the window movement shown in FIG. 14.
Figure 16:
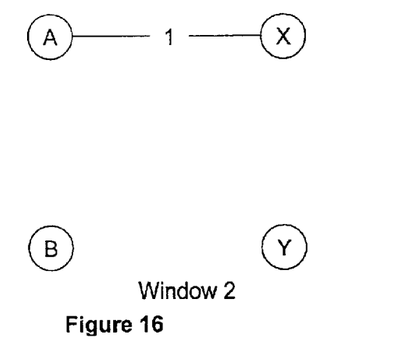
Figure 17:
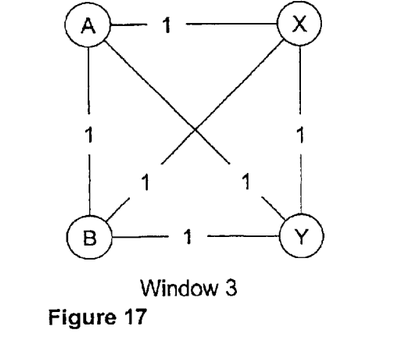

FIGS. 15 to 17 each show the four types A, B, X, Y as vertices in a graph, together with the edge weights appropriate to each window position as the graph develops.

FIG. 15 corresponds to window position 1 in FIG. 14. Since window position 1 contains only event A, in sub-window 86, no edge weights are indicated in the graph. FIG. 15 corresponds to window position 2, which contains event A in sub-window 86 and event X in sub-window 88, so the edge weight between vertices A and X (edge weight A-X) is incremented to value 1. FIG. 16 corresponds to window position 3, which contains events A and B in sub-window 86 and events X and Y in sub-window 88. Of these events, only events B and Y are newly contained in the window, and so edge weights A-B, A-Y, B-X, B-Y and X-Y are incremented to value 1 but edge weight A-X is not modified. Further movement of the window does not add any new events to the window and so the graph is now complete.

It can be seen that the use of sub-windows of different widths allows patterns involving different types of information occurring at different rates to be identified. If the narrower sub-window 88 were used to scan the postal information on time line 80, no pattern involving events A and B would be found, while if the wider sub-window 86 were used to scan the telephone call information on time line 82, unacceptable data smoothing would result, preventing patterns on a short time scale from being identified.

Appendix 1: Connectivity Based Graph Clustering Method

The following embodiment provides for the skilled person a method for identifying clusters in edge-weighted graphs derived as described above. See reference 3 for a definition of any graph-theoretic terms or procedures used in this embodiment.

The method operates in two phases.

Phase 1 uses the evaluation of numerical strength values for all vertices and edges in the graph to reflect how strongly connected they are to neighbouring elements in the graph.

Phase 1 is an iterative process in which, initially, all vertices and edges in the graph are assigned a strength of zero, and the graph is partitioned into its connected components. Each component is then processed in turn. Within each component, the vertex of minimum degree is identified. (Vertex degree is defined as the sum of the weights of the edges connected to the vertex and contained within the current component). Then the strength of each vertex and edge in the component is set equal to this minimum degree, provided it exceeds the current strength value on the edge or vertex. The minimal degree vertex and the edges attached to it are then removed from the component. This disconnects the component into two or more smaller, connected, sub-components, one being the removed minimal vertex. The sub-components are then substituted for the component in the original set of components. The process is repeated until no edges remain in any component.

In phase 2, the method identifies maximal groups of vertices within the graph that possess the following properties:

Each group is connected.

All vertices within the group have the same strength.

All edges connecting vertices within the group have the same strength as the vertices within the group.

All edges connecting vertices within the group to vertices outside the group have strengths that are less than those of the vertices within the group.

These groups are defined to be the clusters identified by the method. The strength of any cluster is defined as the strength of any of the vertices it contains.

The following pseudo-code sets out in more detail a suitable routine for carrying out phases 1 and 2.

```
Function FindConnectivityClusters ( G As Graph ) As ClusterList
    /* Procedure for calculating a list of clusters in a weighted graph,
    G.
    /*
    ComputeStrengthValues ( G )         /* Phase 1.
    Return FindClusters ( G )           /* Phase 2.
End Function
Procedure ComputeStrengthValues ( G As Graph )
    /* Phase 1 of the clustering algorithm.
    InitialiseStrengths ( G )
    ComponentList H = ConnectedComponents ( G )
    Do While Not IsEmptyList ( H )
        Component C = RemoveItemFromListHead ( H )
        If HasEdges ( C ) Then
            (Vertex v, Double w ) = MinimumDegreeVertex ( C )
            UpdateStrengths ( C, w )
            Graph G' = RemoveVertexFromComponent ( C, v )
            H = JoinLists ( H, ConnectedComponents ( G' ) )
        End If
    Loop
End Procedure
Procedure InitialiseStrengths ( G As Graph )
    /* Sets strengths of all graph vertices and edges to zero.
```

```
        For Each Vertex v In G
            Strength(v) = 0
        Next v
        For Each Edge e In G
            Strength(e) = 0
        Next e
    End Procedure
    Procedure UpdateStrengths ( C As Component, w As Double )
        /* Update strengths of all vertices and edges of the component.
        For Each Vertex v In C
            Strength(v) = Max ( w, Strength(v) )
        Next v
        For Each Edge e In C
            Strength(e) = Max ( w, Strength(e) )
        Next e
    End Procedure
    Function HasEdges ( C As Component ) As Boolean
        /* Returns True if the component C contains edges, and False
        otherwise.
    End Function
    Function ConnectedComponents ( G As Graph ) As ComponentList
        /* Given a graph, G, determine its connected components, and return
        /* these in a list. This is a standard problem in computational graph
        /* /* theory, and algorithms for solving it can be found in most
        reference /* /* texts. See reference 3, for example.
    End Function
    Function MinimumDegreeVertex ( C As Component ) Returns ( v As
                                          Vertex, w As Double )
        /* Find the vertex of minimum degree within the connected
        component, C.
        /* Scan the vertices in C, and for each one compute the degree using
        just
        /* those edges that are themselves within C. Return the vertex with
        the
        /* smallest degree, together with the value of this degree. If there
        are /* several candidate vertices, return
        /* any one of them.
    End Function
    Function RemoveVertexFromComponent ( C As Component, v As
    Vertex ) As Graph
        /* Removes vertex v from component C,
        /* and returns the result as a new Graph.
    End Function
    Function FindClusters ( G As Graph ) As ClusterList
        /* Phase 2 of the clustering algorithm.
        FindClusters = CreateEmptyList( )
        UnvisitVertices ( G )
        For Each Vertex v in G
            If Not Visited(v) Then
                AddItemToListHead ( FindClusters, GrowCluster ( v ) )
            End If
        Next v
    End Function
    Procedure UnvisitVertices ( G As Graph )
        /* Mark all vertices in the graph as unvisited.
        For Each Vertex v In G
            Visited(v) = False
        Next v
    End Procedure
    Function GrowCluster ( v As Vertex ) As Cluster
        /* Attempt to grow a cluster from a seed vertex, v.
        /* Returns a cluster if successful, or null if unsuccessful.
        /* GrowCluster identifies a cluster by searching for a connected
        /* group of vertices with the same strength as the seed vertex,
        /* and which are not directly connected to any vertices of
        /* greater strength.
        GrowCluster = CreateEmptyCluster ( )
        VertexList Q = CreateEmptyList ( )
        AddItemToListHead ( Q, v )
        Visited(v) = True
        Do While Not IsEmptyList ( Q )
            Vertex v' = RemoveItemFromListHead ( Q )
            AddVertexToCluster ( GrowCluster, v' )
            For Each Edge e On v'
                If Strength(e) = Strength(v) Then
                    Vertex v' ' = OtherVertexOnEdge ( e, v' )
                    If Strength(v' ') = Strength(v) Then
                        If Not Visited(v' ') Then
                            AddItemToListHead (Q, v' ' )
                            Visited(v' ') = True
                        End If
                    Else
                        GrowCluster = Null
                        Exit Function
                    End If
                End If
            Next e
        Loop
    End Function
    Function OtherVertexOnEdge ( e As Edge, v As Vertex ) As Vertex
        /* Given an edge e and a vertex v on that edge, returns
        /* the vertex at the other end of the edge.
    End Function
    Function CreateEmptyCluster ( ) As Cluster
        /* Returns a cluster containing no vertices.
    End Function
    Procedure AddVertexToCluster ( C As Cluster, v As Vertex )
        /* Add a vertex to a cluster.
    End Procedure
    Function CreateEmptyList( ) As List
        /* Returns a new list with no items.
    End Function
    Function IsEmptyList ( 1 As List ) As Boolean
        /* Returns True if the list is empty, and False otherwise.
    End Function
    Function RemoveItemFromListHead ( 1 As List ) As ListItem
        /* Returns the head (first) item from a list,
        /* and removes the item from the list.
    End Function
    Procedure AddItemToListHead( 1 As List, x As ListItem )
        /* Add an item to the head of the list.
        /* If the item is Null, no action is performed.
    End Procedure
    Function JoinLists ( l1 As List, l2 As List ) As List
        /* Create a new list by connecting two lists together.
        /* The head of l2 is connected to the tail of l1.
    End Function
```

Prior Art Documents Incorporated Herein By Reference

1. H. Mannila, H. Toivonen, A. I. Verkamo. Discovery of frequent episodes in event sequences. Department of Computer Science Series of Publications C. Report C-1997-15

2. R. Agrawal, H. Mannila, R. Srikant, H. Toivonen, A. I. Verkamo. Fast Discovery of Association Rules. In U. M. Fayyad, G. Piatetsky-Shapiro, P. Smyth and R. Uthurusamy, editors, Advances in Knowledge Discovery and Data Mining, pages 307–328. AAAI Press, Menlo Park, Calif., 1996.

3. G. Chartrand, O. R. Oellermann. Applied and Algorithmic Graph Theory.McGraw-Hill (1993)

What is claimed is:

1. A method for identifying repeating patterns in a sequential event stream, each event corresponding to an instance of an event type, comprising the steps of;

creating a graph having two or more vertices, in which each vertex represents one of the types and pairs of vertices are linked by edges;

moving a window through the event stream, identifying when events corresponding to a plurality of the types fall within the window at the same time and weighting the edges in the graph accordingly; and locating clusters within the edge-weighted graph, which correspond to repeating patterns in the event stream.

2. A method according to claim 1, further comprising the steps of;

selecting a set of types from within one of the clusters;

again moving the sampling window through the event stream and identifying non-overlapping windows containing instances of the type set; and generating an output based on the instances of the type set.

3. A method according to claim 1, in which the window is moved stepwise through the event stream.

4. A method according to claim 1, in which the window is moved continuously through the event stream.

5. A method according to claim 1, in which the edge weights are calculated to reflect the frequency with which events instantiating types co-occur in the window.

6. A method according to claim 1, in which the clusters are located using a graph connectivity criterion.

7. A method according to claim 1, in which the width of the window can be predetermined depending on the type of data represented in the event stream.

8. A method according to claim 1, in which the event stream contains a plurality of events occurring at different times and the window moves in time through the event stream.

9. A method according to claim 2, including the step of evaluating the coverage of each instance of a type set and, optionally, generating the output in dependence on the evaluated coverage of each instance.

10. A method according to claim 1, including the step of editing the event stream to remove events of types not present in the type set before re-scanning.

11. A method according to claim 1, in which the window comprises two or more sub-windows of different widths, and each sub-window is moved through different types of events in the event stream.

12. A machine readable media and storing machine readable instructions, said instructions causing the machine to:

create a graph having at least two vertices, in which each vertex of said two vertices represents one of a plurality of event types, and wherein pairs of vertices are linked by edges;

move a window through a sequential event stream having events each of which correspond to an instance of the event types;

identify when events corresponding to a plurality of the types fall within the window at a same time, and weight edges in the graph to represent said identifying; and locate clusters within the edge weighted graph, which clusters correspond to repeating patterns within the event stream.

13. A computer, comprising:

a processor programmed and operative to:

create a graph having at least two vertices, in which each vertex of said two vertices represents one of a plurality of event types, and wherein pairs of vertices are linked by edges;

move a window through a sequential event stream having events each of which correspond to an instance of the event types;

identify when events corresponding to a plurality of the types fall within the window at a same time, and weight edges in the graph to represent said identifying; and locate clusters within the edge weighted graph, which clusters correspond to repeating patterns within the event stream.

* * * * *